J. R. BULLEN.
ATTACHMENT FOR GARDEN AND OTHER SYRINGES.
APPLICATION FILED NOV. 20, 1911.
1,044,985.
Patented Nov. 19, 1912.
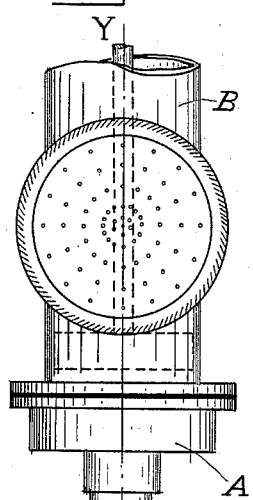
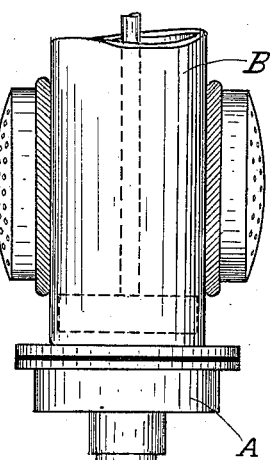
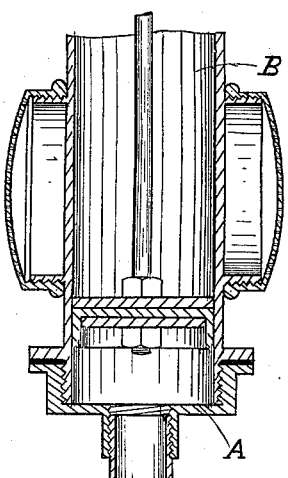
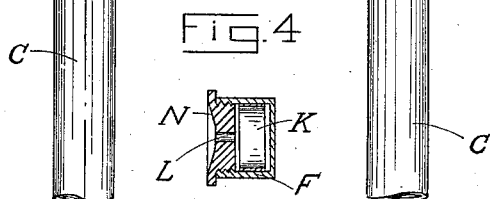
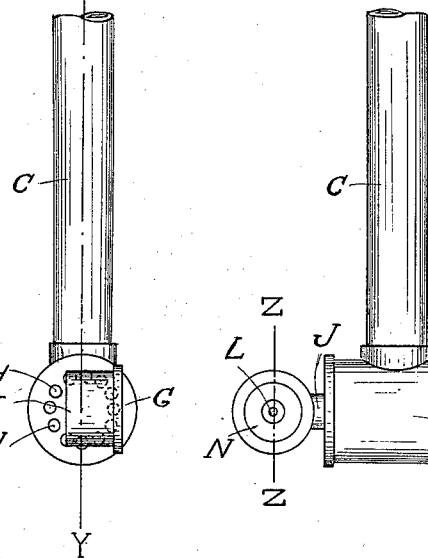
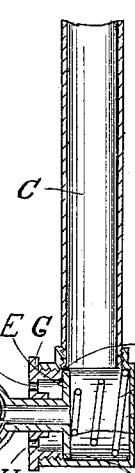
Inventor
John R. Bullen
Witnesses:
COLUMBIA PLANOGRAPH CO., WASHINGTON, D. C.

UNITED STATES PATENT OFFICE.

JOHN ROBERT BULLEN, OF PARNELL, NEAR AUCKLAND, NEW ZEALAND.

ATTACHMENT FOR GARDEN AND OTHER SYRINGES.

1,044,985.   Specification of Letters Patent.   Patented Nov. 19, 1912.

Application filed November 20, 1911. Serial No. 661,194.

*To all whom it may concern:*

Be it known that I, JOHN ROBERT BULLEN, a subject of His Majesty the King of the United Kingdom of Great Britain and Ireland, resident of Parnell, near the city of Auckland, in the Provincial District of Auckland and Dominion of New Zealand, have invented an Improved Attachment for Garden and other Syringes, of which the following is a specification.

This invention relates to garden and other syringes, and its object is to provide an attachment which will enable the operation of spraying to be more easily performed, especially in the cases of spraying high trees and low plants where the mounting of steps and stooping is necessary, and it also causes the liquid used in the process to be converted into an exceedingly fine spray or mist, whereby the spraying is more effectually and economically performed. To carry this into effect a length of tubing having mounted at one end an elbow fitted with an internal valve, and a nozzle, is attached to the plunger or rose end of the syringe, obviating the necessity of the operator leaving the ground or stooping, and on pressure being applied and the liquid forced through the elbow and nozzle hereinafter described, the desired spray is obtained.

The accompanying drawing shows four figures, of which,

Figure 1 is a front view of the plunger or rose end of a syringe with the attachment fitted thereto, Fig. 2 is a side view of the parts illustrated in Fig. 1, Fig. 3 is a longitudinal section on the line Y—Y in Fig. 1, showing the construction of valve and nozzle, and means for recharging the syringe, and, Fig. 4 is a sectional view of the nozzle on the line Z—Z in Fig. 2.

Instead of an ordinary rose a cap A is screwed on the plunger end of the syringe B, and attached thereto, preferably by screwing, is a piece of tubing C of suitable length, and diameter, which carries on its lower end an elbow D fitted with an internal valve E and a nozzle F. A cap G provided with a number of perforations or small holes H is screwed into the elbow D, and a coiled spring I keeps the valve E normally against the screwed boss G′ of the cap G, preventing the egress of liquid through the holes H.

A hollow stem J which is formed integral with the valve E and nozzle F and connects the same, provides a passage for the liquid between the two through the cap G, and also enables the nozzle F to be turned in any direction required, said stem being slidable through a central aperture in said cap. Said stem is arranged axially of the elbow arm wherein it is located, and at right angles to the axis of tube C.

A piece of flat spring or other flexible material K is coiled in the nozzle F and has one end extending across the nozzle end of the passage in the stem J, so as to cover the same, thus materially assisting in the conversion of the liquid into a fine spray before finally leaving the nozzle through the aperture L in the concave face N. The spring end above referred to is bent or forced inwardly of the coil by the liquid passing through the stem, as will be understood.

In use the elbow D is immersed in the liquid to be used, and on the plunger of the syringe being drawn upward the valve E is forced rearwardly into the elbow D by the suction exerted thereon, thus compressing the spring I and allowing the liquid to fill the tube C and syringe B through the holes H. Immediately the up stroke of the plunger ceases, the spring I asserts itself, and forces the valve E back against the screwed boss G′, so as to prevent any escape of liquid through the holes H. On the elbow being withdrawn from the liquid, and pressure applied by forcing the plunger downward, the liquid is forced into the elbow D, through the stem J, and strikes the piece of flat spring K coiled in the nozzle F, which compresses sufficiently to allow the liquid to be diverted around between it and the side of the nozzle, creating a whirlpool so that on emerging from the nozzle through the aperture L, the liquid is thrown out in a cloud of the finest spray.

A special advantage gained by using the attachment described, is the construction of the nozzle F, it being so made that it can be turned to point at the operator or in any other direction, which is especially advantageous when spraying the underneath of low lying leaves and plants.

Other advantages are that the length of the tube C can be made to suit requirements or in series as is desired, and obviates the necessity of reaching, stooping, or mounting steps when using the syringe, also the placing of the flat spring K in the nozzle has a big share in the converting of the liquid into a fine spray, which economizes the liquid considerably, and also the cap G being perforated with holes H, adapted to be opened or closed by the spring operated valve E, allows of a very quick recharge being obtained.

Having now fully described my invention, what I desire to claim and secure by Letters Patent is:—

1. A syringe attachment comprising an elbow adapted for connection to the syringe and provided with a cap having a central aperture and perforations surrounding the same; a spring-controlled valve disposed within said elbow for normally closing said perforations; a nozzle; and a tubular stem rigidly connecting said nozzle and valve and opening through said valve and the wall of said nozzle at opposite ends, said stem being slidably fitted in said aperture, to permit the movement of said valve into position to open said perforations.

2. A syringe attachment comprising an elbow adapted for connection to the syringe and provided with a cap having a central aperture, and perforations surrounding the same; a spring-controlled valve disposed within said elbow for normally closing said perforations; a nozzle; and a tubular stem rigidly connecting said nozzle and valve and opening through said valve and the wall of said nozzle at opposite ends, said stem being rotatably and slidably fitted in said cap, to permit a turning movement of said nozzle, to vary the direction of the liquid discharged therefrom, and a bodily movement of said valve into position to open said perforations.

3. A syringe nozzle provided with a tubular stem opening thereinto; and a spraying spring coiled within said nozzle and having one end extending laterally across the stem opening in position to normally close said opening and to be bent inwardly of the coil by the liquid passing through said stem.

4. A syringe nozzle provided with a tubular stem opening thereinto; and a compressible spraying member coiled within said nozzle and having one end extending laterally across the stem opening in position to normally close said opening and to be bent inwardly of the coil by the liquid passing through said stem.

5. A syringe attachment comprising an elbow adapted for connection to the syringe and provided with a cap having a central aperture; a nozzle provided with an open-ended tubular stem rigidly connected thereto and rotatably fitted in said aperture, to permit a turning movement of said nozzle, to vary the direction of the liquid discharged therefrom; and a compressible spraying member disposed within said nozzle and having one end extending laterally across the stem opening in position to close said opening and to be bent inwardly of the coil by the liquid passing through said stem.

6. A syringe attachment comprising an elbow adapted for connection to the syringe and provided with a cap having a central aperture, and perforations surrounding the same; a spring-controlled valve disposed within said elbow for normally closing said perforations; a nozzle; a tubular stem rigidly connecting said nozzle and valve and opening through said valve and the wall of said nozzle at opposite ends, said stem being slidably fitted in said aperture, to permit the movement of said valve into position to open said perforations; and a compressible spraying member coiled within said nozzle and extending across the stem opening in position to be acted upon by the liquid passing through said stem.

7. A syringe attachment comprising an elbow adapted for connection to the syringe and provided with a cap having a central aperture, and perforations surrounding the same; a spring-controlled valve disposed within said elbow for normally closing said perforations; a nozzle; a tubular stem rigidly connecting said nozzle and valve and opening through said valve and the wall of said nozzle at opposite ends, said stem being rotatably and slidably fitted in said cap, to permit a turning movement of said nozzle, to vary the direction of the liquid discharged therefrom, and a bodily movement of said valve into position to open said perforations; and a compressible spraying member coiled within said nozzle and extending across the stem opening in position to be acted upon by the liquid passing through said stem.

JOHN ROBERT BULLEN.

Witnesses:
GEORGE WILLIAM BASLEY,
MARY CHRISTINA BRENNAN.

---

Copies of this patent may be obtained for five cents each, by addressing the "Commissioner of Patents, Washington, D. C."